(12) United States Patent
Nakache et al.

(10) Patent No.: US 7,769,074 B2
(45) Date of Patent: Aug. 3, 2010

(54) DETECTING AND SYNCHRONIZING TO FREQUENCY HOPPED PACKETS

(75) Inventors: Yves-Paul Nakache, Cambridge, MA (US); Nikolaus Lehmann, Jersey City, NJ (US)

(73) Assignee: Renesas Technology Corporation, Tokyo (JP)

( * ) Notice: Subject to any disclaimer, the term of this patent is extended or adjusted under 35 U.S.C. 154(b) by 860 days.

(21) Appl. No.: 11/369,851

(22) Filed: Mar. 8, 2006

(65) Prior Publication Data

US 2007/0211785 A1    Sep. 13, 2007

(51) Int. Cl.
 *H04B 1/00*    (2006.01)
(52) U.S. Cl. .................. 375/132; 375/137; 375/260; 375/267; 375/150; 375/138
(58) Field of Classification Search ................ 375/260, 375/132, 136, 267, 150, 137, 134, 340
See application file for complete search history.

(56) References Cited

U.S. PATENT DOCUMENTS

| | | | | | |
|---|---|---|---|---|---|
| 5,121,408 | A | * | 6/1992 | Cai et al. ..................... | 375/134 |
| 5,625,641 | A | * | 4/1997 | Takakusaki .................. | 375/137 |
| 7,474,686 | B2 | * | 1/2009 | Ho .............................. | 375/132 |
| 2004/0105512 | A1 | * | 6/2004 | Priotti ......................... | 375/340 |
| 2005/0078598 | A1 | * | 4/2005 | Batra et al. .................. | 370/206 |
| 2005/0176371 | A1 | * | 8/2005 | Palin et al. .................. | 455/41.2 |
| 2005/0238108 | A1 | * | 10/2005 | Suh et al. .................... | 375/260 |
| 2005/0265220 | A1 | * | 12/2005 | Erlich et al. ................. | 370/208 |
| 2007/0160115 | A1 | * | 7/2007 | Palanki et al. ............... | 375/132 |
| 2008/0212563 | A1 | * | 9/2008 | Birru .......................... | 370/350 |
| 2009/0296684 | A1 | * | 12/2009 | Ye et al. ..................... | 370/350 |

* cited by examiner

*Primary Examiner*—Sudhanshu C Pathak
(74) *Attorney, Agent, or Firm*—Buchanan Ingersoll & Rooney, PC

(57) ABSTRACT

Methods and systems for detecting and synchronizing to frequency hopped packets are presented. A technique for detecting a transmitter frequency hopping pattern includes receiving a packet of preamble symbols respectively transmitted over multiple frequency sub-bands according to the transmitter frequency hopping pattern, and partitioning predetermined frequency hopping patterns into disjoint groups of patterns, each group of patterns having an associated periodicity of the received preamble symbols. A group of patterns is selected by comparing a correlation metric of two received preamble symbols for each of the associated periodicities in a first selected frequency sub-band, and a pattern from the selected group of patterns is selected based on a timing of a detected first peak of the correlation metric in a second selected frequency sub-band. Optionally, the selected pattern is verified by comparing the correlation metric at a particular time interval to a threshold value in a third selected frequency sub-band.

22 Claims, 5 Drawing Sheets

DETECTING AND SYNCHRONIZING TO FREQUENCY HOPPED PACKETS

CROSS-REFERENCE TO RELATED APPLICATIONS

This disclosure is related to U.S. patent application Ser. No. 11/369,867, entitled "SYNCHRONIZING TO SYMBOLS RECEIVED VIA WIRELESS COMMUNICATIONS CHANNEL," by Yves-Paul Nakache, filed concurrently herewith.

FIELD OF THE DISCLOSURE

The present disclosure relates generally to communication networks. More particularly, the present disclosure relates to techniques for detecting and synchronizing packets of data received via different frequency sub-bands.

DESCRIPTION OF THE RELATED ART

Different techniques for detecting and synchronizing packets of data received via different sub-bands have been proposed. For example, U.S. Patent Application Publication No. 2005/0176371 (published Aug. 11, 2005) relates to synchronization of time frequency codes. Similarly, U.S. Patent Application Publication No. 2005/0078598 (published Apr. 14, 2005) pertains to enhancements to the Multiband Orthogonal Frequency Division Multiplexing (OFDM) Physical Layer.

BACKGROUND OF THE INVENTION

Many communication networks, such as networks designed according to the Ethernet and IEEE 802.11b standards, transmit data in packets. These networks use many different methods to access the physical medium. For example, one typical access method uses a carrier sense, multiple access/collision avoidance (CSMA/CA) protocol. Because these methods transmit packets at random times, and because of transmission delays, one problem that arises is detection of and synchronization to the packets in a receiver. Synchronization is necessary to properly process the blocks of data in each packet. Thus, most transmitters send a preamble, which is a particular sequence of symbols, to enable packet detection and synchronization in the receiver. Furthermore, the receiver can use the preamble to estimate several related parameters, such as a frequency offset and channel state information.

Detecting and synchronizing to the packets and estimating the related parameters becomes more difficult, however, when the symbols are transmitted over different frequency sub-bands according to a frequency hopping pattern. In such systems, each network uses a different sequence of sub-bands to transmit and receive packets, called a "frequency hopping pattern," to reduce collisions between devices belonging to different networks. A transceiver using this mode of transmission over several frequency bands is called "frequency hopping" or "time frequency interleaving." A new device attempting to join a network, however, does not know a priori the sequence being used by the network.

What is needed, therefore, are techniques for devices joining a frequency hopping network for detecting and synchronizing to frequency hopped packets.

BRIEF SUMMARY OF THE DISCLOSURE

Methods and systems for detecting and synchronizing to frequency hopped packets are described herein.

In accordance with a first aspect of the present invention, a method for detecting a frequency hopping pattern includes partitioning predetermined frequency hopping patterns into disjoint groups each having a different associated periodicity, and analyzing a signal received in a selected frequency sub-band relative to the periodicities associated with the respective groups. The method further includes selecting one of the groups of frequency hopping patterns based on the analysis, detecting an energy peak in a received signal in at least one other frequency sub-band, and identifying one frequency hopping pattern within the selected group on the basis of the detected energy peak.

In accordance with a second aspect of the present invention, a method for detecting a transmitter frequency hopping pattern includes receiving a packet of preamble symbols respectively transmitted over multiple frequency sub-bands according to the transmitter frequency hopping pattern, and partitioning predetermined frequency hopping patterns into disjoint groups of patterns, each group of patterns having an associated periodicity of the received preamble symbols. The method further includes selecting a group of patterns by comparing a correlation metric of two received preamble symbols for each of the associated periodicities in a first selected frequency sub-band, and selecting a pattern from the selected group of patterns based on a timing of a detected first peak of the correlation metric in a second selected frequency sub-band. Optionally, the method also includes verifying that the selected pattern corresponds to the transmitter frequency hopping pattern by comparing the correlation metric at a particular time interval to a threshold value in a third selected frequency sub-band.

In accordance with a third aspect of the present invention, a computer readable medium is described having stored therein a program, which when executed causes a processor to perform the following functions for detecting a transmitter frequency hopping pattern: comparing a correlation metric of preamble symbols respectively transmitted over multiple frequency sub-bands according to the transmitter frequency hopping pattern; selecting a group of patterns from multiple groups of predetermined frequency hopping patterns, each group having an associated periodicity, based on the comparison of the correlation metric for each of the associated periodicities in a first selected frequency sub-band; and selecting a pattern from the selected group of patterns based on a timing of a detected first peak of the correlation metric in a second selected frequency sub-band.

In accordance with a fourth aspect of the present invention, a system for detecting a transmitter frequency hopping pattern includes a receiver unit configured to receive a packet of preamble symbols respectively transmitted over multiple frequency sub-bands according to the transmitter frequency hopping pattern, and a synchronization unit coupled to the receiver unit configured to synchronize to the received packet according to a selected pattern. The synchronization unit first selects a group of patterns from multiple disjoint groups of predetermined patterns based on a correlation metric for an associated periodicity of the received preamble symbols in a first selected frequency sub-band. Then, the synchronization unit selects the pattern from the selected group of patterns based on a timing of a first peak of the correlation metric in a second selected frequency sub-band. Optionally, the synchronization unit verifies the selected pattern corresponds to the transmitter frequency pattern by comparing the correlation metric at a particular time interval to a threshold value in a third selected frequency sub-band.

BRIEF DESCRIPTION OF THE DRAWING FIGURES

The objects and advantages of the present disclosure will be understood by reading the following detailed description in conjunction with the drawings in which.

Figure 4:
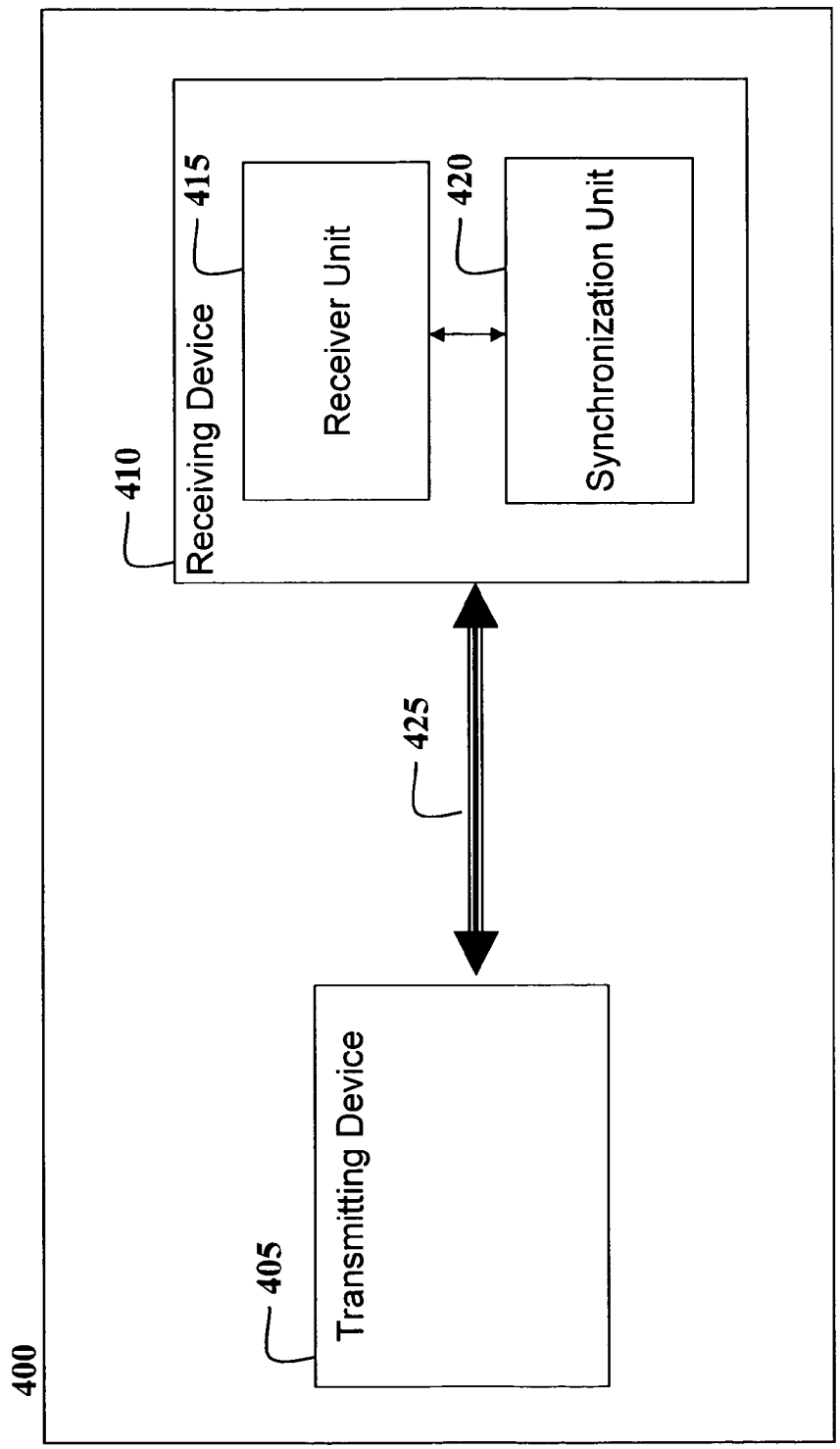
Figure 5:
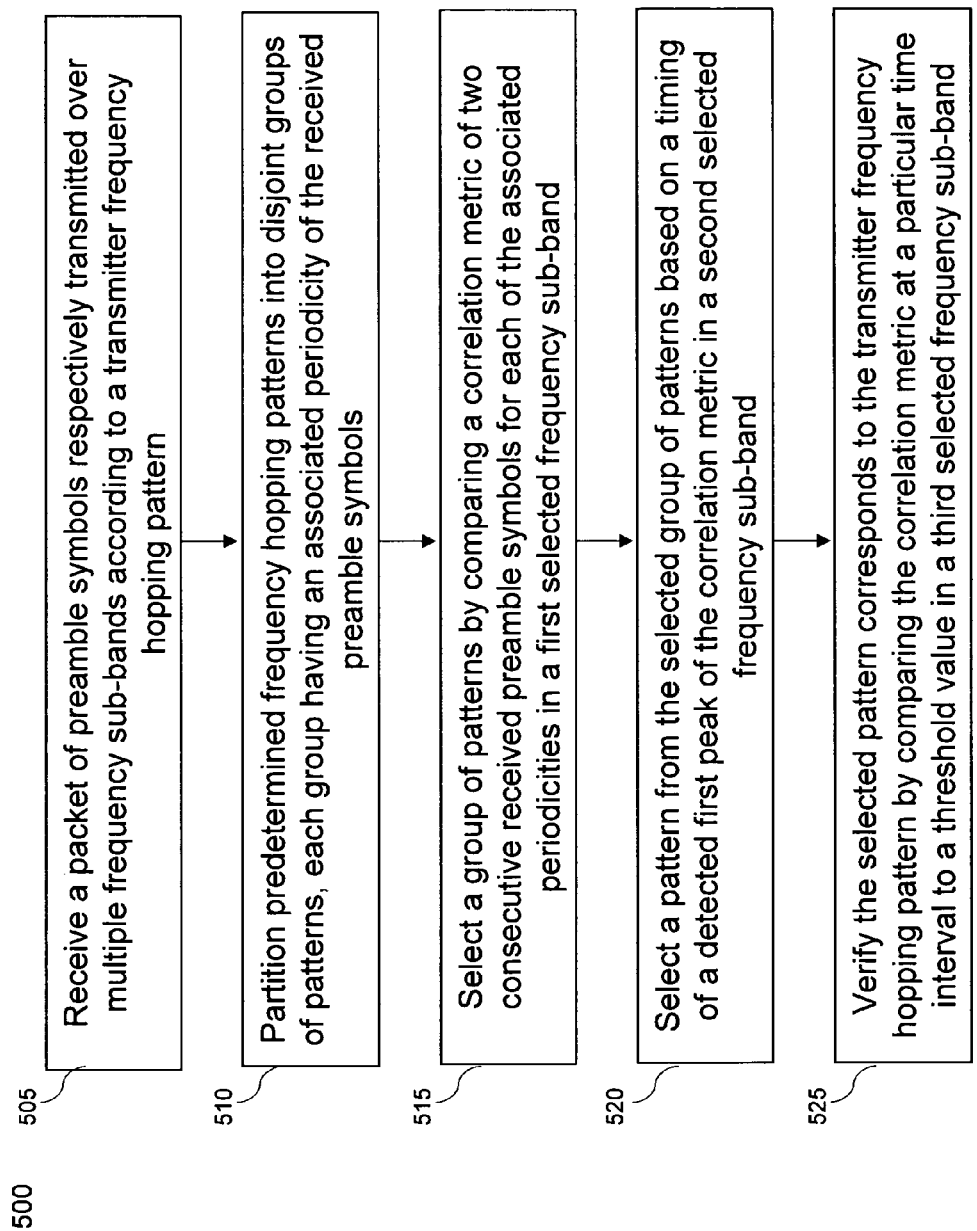

FIG. 4 is a system for identifying a selected frequency hopping pattern for detecting packets and synchronizing to blocks in accordance with an exemplary embodiment of the present disclosure; and FIG. 5 is flowchart providing steps for identifying a selected frequency hopping pattern for detecting packets and synchronizing to blocks in accordance with an exemplary embodiment of the present disclosure.

DETAILED DESCRIPTION OF THE INVENTION

Overview

As described above, a problem for a device attempting to join a frequency hopping network is detection of a frequency hopping pattern employed by the network. One technique for identifying the frequency hopping pattern includes partitioning a set of possible frequency hopping patterns into multiple disjoint groups. The groups of patterns can be distinguished based on a period of transmission of a training pattern in a selected frequency sub-band, and the frequency hopping patterns within each group of patterns can be distinguished based on a time difference between transmissions in different respective frequency sub-bands. Each frequency sub-band is monitored in turn and, based on these distinctions, one of the groups of patterns is selected, and one of the frequency hopping patterns from the selected group of patterns is identified. The received blocks of symbols are then synchronized accordingly.

An exemplary frequency hopping network for which this technique can be implemented is described by the WiMedia MultiBand OFDM Alliance (MBOA) physical (PHY) layer specifications, which are herein incorporated by reference in their entireties. In this example, a packet is made up of multiple blocks (i.e., OFDM symbols) transmitted through three sub-bands, each sub-band having a different center frequency. The blocks are transmitted through the frequency sub-bands in accordance with a time frequency interleaving sequence (i.e., a frequency hopping pattern) selected by the network to allow communication between devices. In the preamble of each packet, identical OFDM symbols are transmitted in the different frequency sub-bands in accordance with the selected sequence. A device can use the preamble to detect the selected sequence, detect the packet, and synchronize to the blocks. Although the embodiments of the present invention for detecting and synchronizing to frequency hopped packets described below are partially based on the WiMedia PHY specifications, it should be noted that these techniques can also be adapted to other packet-based transmission schemes that use frequency hopping.

A detailed description of techniques for detecting and synchronizing to frequency hopped packets is presented below, followed by detailed descriptions of exemplary systems and methods for detecting and synchronizing to frequency hopped packets in accordance with one or more embodiments of the present disclosure. The explanation will be by way of exemplary embodiments to which the present invention is not limited.

Techniques for Detecting and Synchronizing to Frequency Hopped Packets

Figure 1:
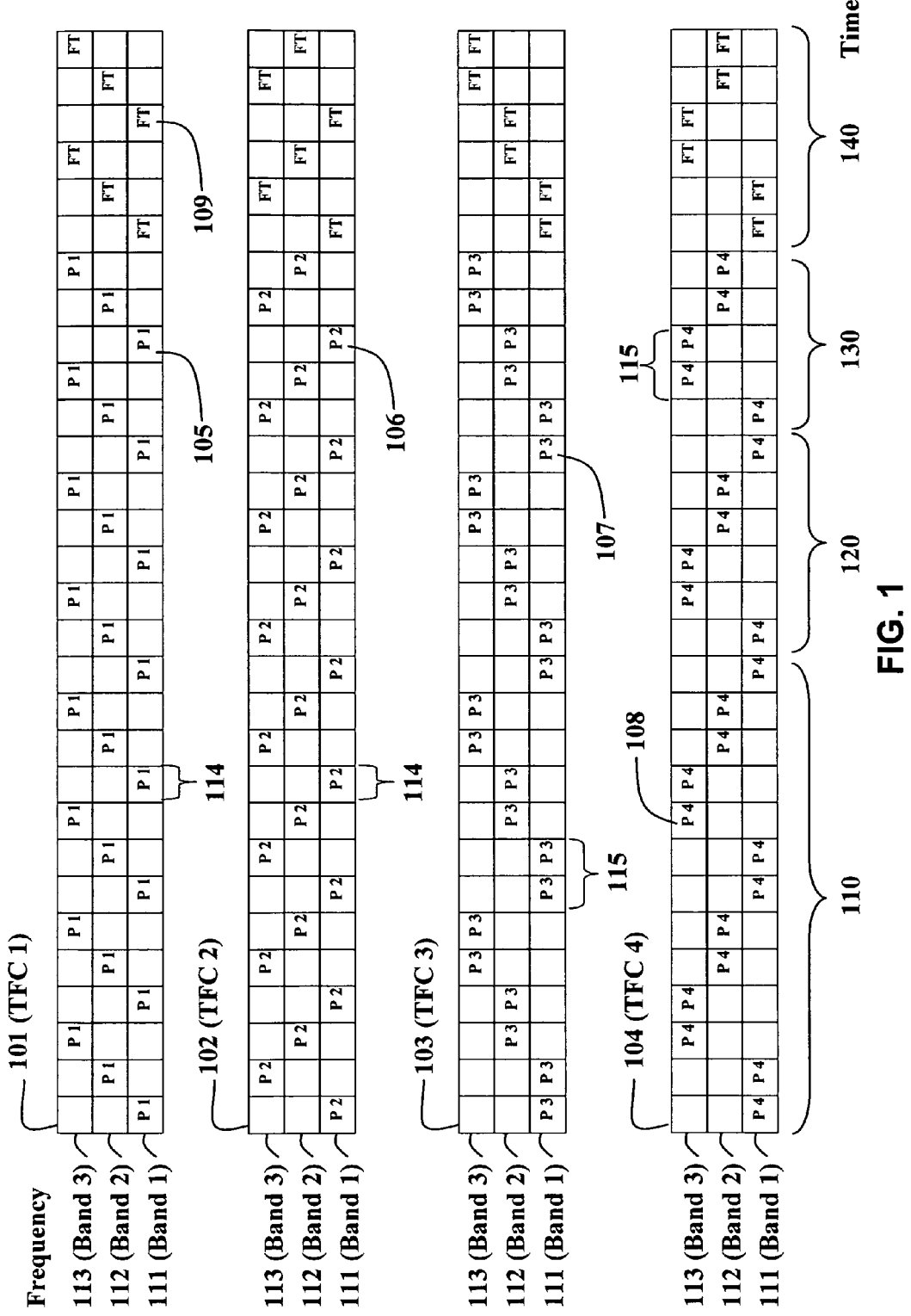
FIG. 1 is a timing diagram of exemplary preamble structures of interleaved data blocks transmitted via multiple frequency sub-bands according to a selected frequency hopping pattern.

FIG. 1 is a timing diagram of exemplary preamble structures for interleaved data blocks transmitted via multiple frequency sub-bands according to a selected frequency hopping pattern. In the example of FIG. 1, three different frequency sub-bands are used: frequency sub-band 111 (Band 1), frequency sub-band 112 (Band 2), and frequency sub-band 113 (Band 3). The preamble structures include four symbol patterns: a first symbol pattern 105 (P1), a second symbol pattern 106 (P2), a third symbol pattern 107 (P3), and a fourth symbol pattern 108 (P4). For a given network, one symbol pattern is transmitted repeatedly with a particular period.

In the example of FIG. 1, seven identical preamble symbol patterns are transmitted in each frequency sub-band followed by an eighth preamble symbol having a different polarity, which identifies the end of the preamble structure. Following the preamble structure, other non-preamble symbols are transmitted, which are shown as symbols 109 (FT) in FIG. 1.

Four different time intervals 110, 120, 130, and 140 are also identified in FIG. 1. These time intervals correspond to the operation of four different states of a state diagram shown in FIG. 3. For example, after the preamble structure has been transmitted during the time intervals 110, 120, and 130, frequency domain (f) training is performed during the time interval 140.

FIG. 1 also shows four different frequency hopping patterns 101, 102, 103, and 104, which the proposed MB-OFDM standard refers to as "time frequency codes (TFC)." Each frequency hopping pattern defines a sequence of the frequency sub-bands 111, 112, and 113 (Band 1, Band 2, and Band 3, respectively) for transmitting the preamble structure. For the pattern 101 (TFC 1), the symbol pattern 105 (P1) is repeatedly transmitted according to the sequence Band 1, Band 2, and Band 3. For the pattern 102 (TFC 2), the symbol pattern 106 (P2) is repeatedly transmitted according to the sequence Band 1, Band 3, and Band 2. For the pattern 103 (TFC 3), the symbol pattern 107 (P3) is repeatedly transmitted according to the sequence Band 1, Band 1, Band 2, Band 2, Band 3, and Band 3. Finally, for the pattern 104 (TFC 4), the symbol pattern 108 (P4) is repeatedly transmitted according to the sequence Band 1, Band 1, Band 3, Band 3, Band 2, and Band 2. Note that the frequency hopping patterns 101-104 need not be implemented with the symbol patterns 105-108, respectively, shown in FIG. 1. For example, each one of the frequency hopping patterns 101-104 can be implemented with the same symbol pattern.

As described above, a new device attempting to join a frequency hopping network does not know a priori the frequency hopping pattern being used by the network. According to one technique, the new device calculates a correlation metric to detect the frequency hopping pattern being used by the network. An estimate of the power of the received signal can be determined according to the following:

$$m_P(l) = \sum_{n=l}^{l+N+R} r^*(n-P) * r(n), \text{ and} \quad (1)$$

$$m(l) = \sum_{n=l}^{l+N+R} r^*(n) * r(n). \quad (2)$$

A cross-correlation of the received signal and a template of the pattern can be determined according to the following:

$$m(l) = \sum_{n=l}^{l+N+R} t^*(n-l+1) * r(n). \quad (3)$$

In equations (1)-(2) above, r(n) refers to the received baseband signal samples, r*(n) refers to the complex conjugated received samples, N to the number of samples of a symbol block, and R to the additional number of received samples due to, for example, a cyclic prefix or zero padding duration. In equation (3), t(n) refers to known values of a stored template of the training pattern. In equation (1), P refers to the period with which the training pattern is transmitted in one of the frequency sub-bands.

Because the power estimates generated by equations (2) and (3) will typically not be as robust as the power estimate generated by equation (1) in the presence of multipaths associated with ultra-wideband channels, the techniques for detecting and synchronizing to frequency hopped packets described below are based on estimating the power of the received signal according to equation (1). Related U.S. patent application Ser. No. 11/369,867, entitled "Synchronizing to Symbols Received via Wireless Communications Channel," filed concurrently herewith, describes the parameters of equation (1) in more detail and is herein incorporated by reference in its entirety. As will be apparent to persons skilled in the relevant art(s) based on the teachings herein, equations (2) and (3) can also be used to estimate the power of the received signal.

For each frequency hopping pattern, one symbol pattern is transmitted consecutively with a particular periodicity in the three frequency sub-bands. As shown in FIG. 1, frequency hopping patterns 101 and 102 (TFC 1 and TFC 2) transmit a symbol one time in a given frequency sub-band before transmitting the symbol in a different frequency sub-band, so the period P before the symbol is retransmitted in a given frequency sub-band is three symbol durations. Frequency hopping patterns 103 and 104 (TFC 3 and TFC 4) transmit a symbol two times in one frequency sub-band before transmitting the symbol in a different frequency sub-band, so the period P before a symbol is retransmitted in a given frequency sub-band is one symbol duration. Assuming for the example frequency hopping patterns of FIG. 1 that one OFDM symbol (block) duration is 165 samples, then the WiMedia PHY specifications provide that the number of samples within the period P is either 165 samples (for TFC 3 and TFC 4) or 495 samples (for TFC 1 and TFC 2).

Figure 2:
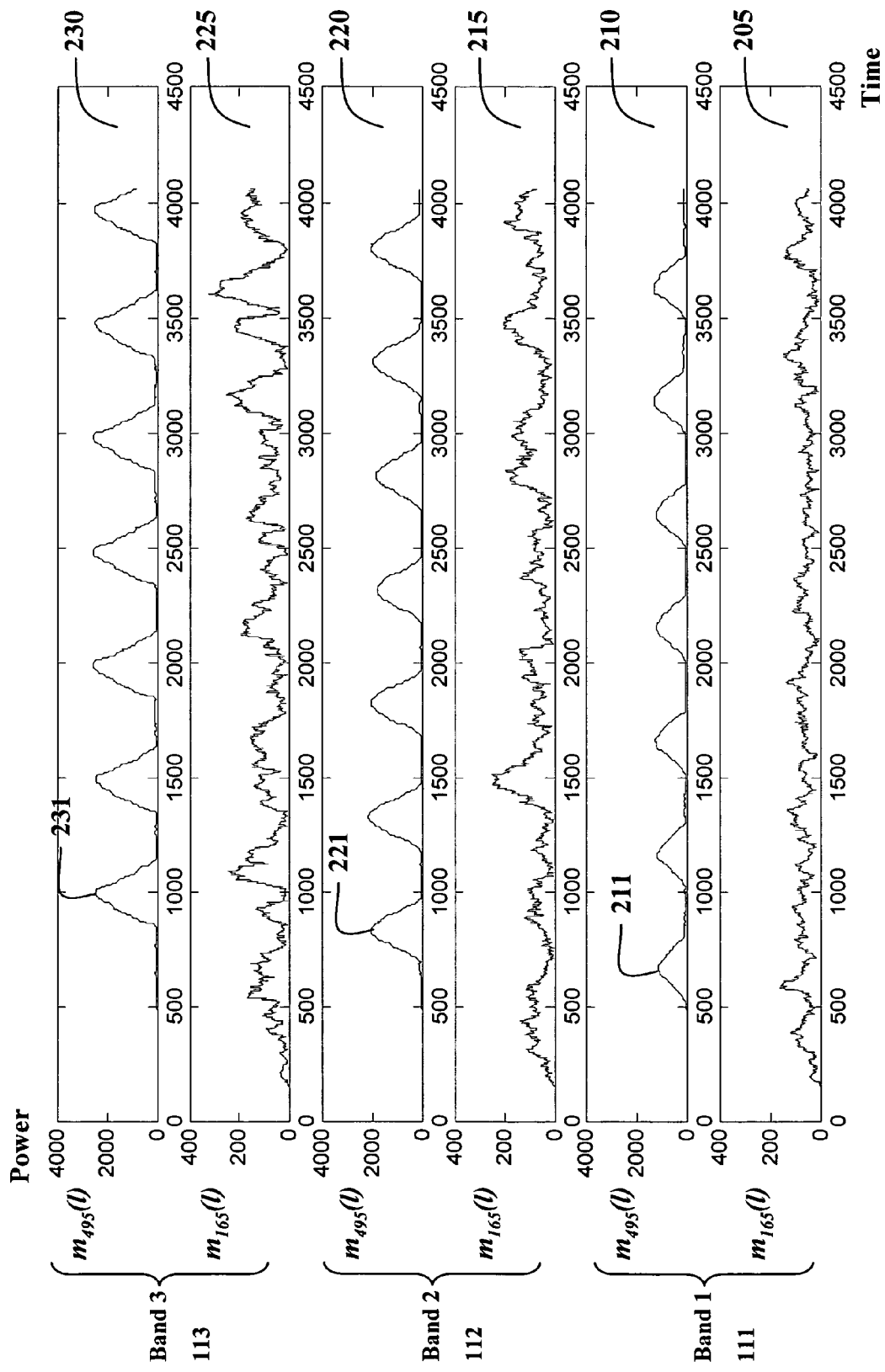
FIG. 2 is a timing diagram of a correlation metric calculated for the exemplary preamble structures of the interleaved data blocks transmitted via the multiple frequency sub-bands shown in FIG. 1.

FIG. 2 is a timing diagram of a correlation metric calculated for the preamble structures for the interleaved data blocks transmitted via the multiple frequency sub-bands shown in FIG. 1. FIG. 2 shows the power level (i.e., the output of the metric $m_p(l)$ calculated according to equation (1) above) versus time in the three frequency sub-bands 111-113 (Bands 1-3) for the frequency hopping pattern 101 (TFC 1). For each of the frequency sub-bands, the metric is calculated for the period P=165 samples ($m_{165}(l)$ in FIG. 2) and for the period P=495 samples ($m_{495}(l)$ in FIG. 2). For example, for the frequency sub-band 111 (Band 1), FIG. 2 shows the metric output signal 205 for P=165 samples and the metric output signal 210 for P=495 samples. Similarly, for the frequency sub-band 112 (Band 2), FIG. 2 shows the metric output signal 215 for P=165 samples and the metric output signal 220 for P=495 samples, and for the frequency sub-band 113 (Band 3), FIG. 2 shows the metric output signal 225 for P=165 samples and the metric output signal 230 for P=495 samples.

In accordance with one or more embodiments of the present disclosure, a receiver can analyze the metric output signals 205-230 to determine which frequency hopping pattern is being used by the network. For instance, as described above for the example of FIG. 1, the frequency hopping patterns 101 and 102 can be distinguished from the frequency hopping patterns 103 and 104 based on the periodicity of transmission of the symbol patterns. In the example of FIG. 1, for the WiMedia PHY specifications, the symbol patterns for frequency hopping patterns 101 and 102 (TFC 1 and 2) have an associated periodicity of 495 samples, while the symbol patterns for the frequency hopping patterns 103 and 104 (TFC 3 and 4) have an associated periodicity of 165 samples.

As shown in FIG. 2, a receiver analyzing the output metric signals 205 and 210 for the frequency sub-band 111 (Band 1), with respect to a predetermined power threshold, will detect consecutive signal peaks for the output metric signal 210 and noise for the output metric signal 205. Similarly, for the frequency sub-band 112 (Band 2) the receiver will detect consecutive signal peaks for the output metric signal 220 and noise for the output metric signal 215, and for the frequency sub-band 113 (Band 3) the receiver will detect consecutive signal peaks for the output metric signal 230 and noise for the output metric signal 225. Each of the signal peaks represents the correlation between two successive preamble symbols.

In FIG. 2, because the output metric signals having the successive peaks that exceed the threshold correspond to P=495 samples ($m_{495}(l)$), the receiver can determine that the network is using the frequency hopping pattern 101 or 102 (TFC 1 or TFC 2) instead of the frequency hopping pattern 103 or 104 (TFC 3 or TFC 4). Alternatively, if the output metric signals having the successive peaks that exceed the threshold correspond to P=165 samples ($m_{165}(l)$), the receiver can determine that the network is using the frequency hopping pattern 103 or 104 (TFC 3 or TFC 4) instead of the frequency hopping pattern 101 or 102 (TFC 1 or TFC 2).

Additionally, the receiver can analyze the timing of the metric output signal peaks to further identify which frequency hopping pattern is being used by the network. For instance, as shown in FIG. 2, the frequency hopping pattern 101 can be distinguished from the frequency hopping pattern 102 based on a timing of the first peaks 211, 221, and 231 of the metric output signals 210, 220, and 230, respectively. In this case, the peak 211 occurs first in the frequency sub-band 111 (Band 1), followed by the peak 221 in the frequency sub-band 112 (Band 2), and then the peak 231 in the frequency sub-band 113 (Band 3). This sequence (Band 1, Band 2, Band 3) corresponds to the frequency hopping pattern 101, shown in FIG. 1.

Figure 3:
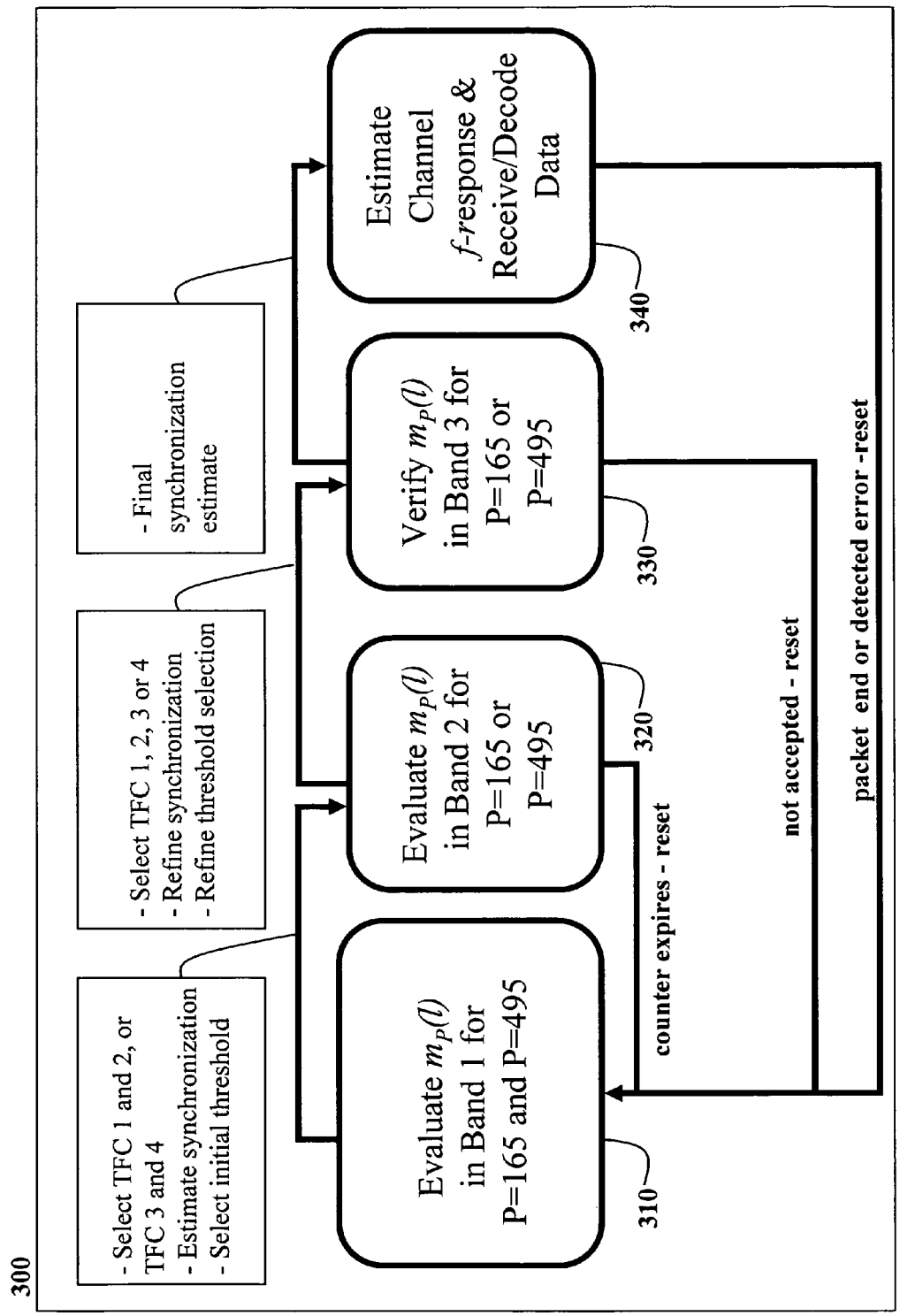
FIG. 3 is a state diagram of a technique for identifying a selected frequency hopping pattern for detecting packets and synchronizing to blocks in accordance with an exemplary embodiment of the present disclosure.

Because it is impractical (e.g., too expensive) to implement the receiver with multiple correlators, such that all of the frequency sub-bands can be analyzed simultaneously, an approach is needed for analyzing the frequency sub-bands in turn based on using only one correlator. FIG. 3 is a state diagram 300 illustrating such an approach for identifying the selected frequency hopping pattern in accordance with an exemplary embodiment of the present disclosure. The state diagram 300 is adapted for the exemplary preamble structures and frequency sub-band configuration of FIG. 1, however, the state diagram 300 could be adapted for other preamble structures and frequency sub-band configurations, as will be apparent to persons skilled in the relevant art(s) based on the teachings herein.

Initially, as described above, the set of possible frequency hopping patterns is partitioned into multiple disjoint groups of patterns. For example, the patterns TFC 1 and TFC 2 can be distinguished from the patterns TFC 3 and TFC 4 based on the period of transmission of the symbol patterns. In one implementation, the patterns TFC 1 and 2 correspond to P=495 samples and the patterns TFC 3 and 4 corresponding to P=165 samples. Thus, in this example, a first group of patterns includes the patterns TFC 1 and TFC 2 and a second group of patterns includes the patterns TFC 3 and TFC 4. Thus, for each group of patterns, the distance between successive energy peaks of the output of the metric in a given frequency sub-band is different. The set of possible frequency hopping patterns can be partitioned into groups in other ways, however, depending on the total number of patterns, as will be apparent to persons skilled in the relevant art(s) based on the teachings herein.

In a first state 310, which corresponds to the time interval 110 shown in FIG. 1, one of the groups of patterns is selected. For this example, either the first group, which includes TFC 1 and 2, or the second group, which includes TFC 3 and 4, is selected as follows. In the first state 310, a first frequency sub-band is selected, and the metric $m_p(l)$, shown in equation (1) above, is evaluated at various intervals in the first selected frequency sub-band for each of the periods associated with the groups of patterns. In the example of FIG. 3, the frequency sub-band 111 (Band 1) is selected, and the metric $m_p(l)$ is evaluated for P=495, which is associated with the first group of patterns, and for P=165, which is associated with the second group of patterns. The group of patterns corresponding to the period for which the metric $m_p(l)$) exceeds a threshold value at various time intervals is selected. In the first state 310, an initial threshold value is selected. The threshold value defines a power level, above which an energy peak will be detected. Note that detection of at least one energy peak in the first selected frequency band is sufficient to make a selection of a group of patterns and advance to the next state.

For example, as described above, FIG. 2 illustrates the output of the correlation metric $m_p(l)$ versus time for the frequency sub-band 111 (Band 1). The output metric signal 211 ($m_{495}(l)$) corresponds to P=495 samples, which is the associated periodicity for the first group of patterns, and the output metric signal 205 ($m_{165}(l)$) corresponds to P=165 samples, which is the associated periodicity for the second group of patterns. As shown in FIG. 2, consecutive energy peaks for the output metric signal 211 ($m_{495}(l)$) will likely be detected when compared to the threshold value, but no energy peaks will likely be detected for the output metric signal 205 ($m_{165}(l)$), which is noise. Because the energy peaks are detected for the periodicity associated with the first group of patterns, the first state 310 will estimate that the unknown pattern corresponds to a pattern in the first group (i.e., TFC 1 or TFC 2).

In one implementation, the intervals and the power threshold depend on an optimal signal-to-noise ratio (SNR). For example, the SNR for a received signal assuming a particular distance between the transmitter and the receiver is considered and adapted based on the received signal energy in the selected frequency sub-band. Optionally, the evaluation can be implemented using a conventional Neyman Pearson detection scheme.

With the selection of one of the groups patterns, an initial synchronization estimate for the beginning of the packet is inherently determined. As described in related U.S. patent application Ser. No. 11/369,867, entitled "Synchronizing to Symbols Received via Wireless Communications Channel," filed concurrently herewith, the correlation metric $m_p(l)$ can be used to estimate an optimal time offset for synchronization.

In a second state 320, which corresponds to the time interval 120 shown in FIG. 1, one of the frequency hopping patterns in the selected group of patterns is selected as the unknown frequency hopping pattern. In the second state 320, a second frequency sub-band is selected, and the timing of the first peak of the metric $m_p(l)$ is evaluated at a particular time interval to identify which pattern of the selected group of patterns corresponds to the unknown pattern. In the example of FIG. 3, the frequency sub-band 112 (Band 2) is selected, and the timing of the first peak of the metric $m_p(l)$ is evaluated for either P=165 samples or P=495 samples, depending on which group of patterns is selected in the first state 310. The pattern that corresponds to the evaluated timing is selected. When the second state 320 is implemented in accordance with the WiMedia PHY specifications, and the estimated synchronization is accurate, the system searches for a peak in the second selected frequency sub-band starting from the $2145^{th}$ sample.

For example, as described above, FIG. 2 illustrates the output of the correlation metric $m_p(l)$ versus time for the frequency sub-band 112 (Band 2). If the first group of patterns is selected in the first state 310, then the timing of the first peak 221 of the output metric signal 220 ($m_{495}(l)$) is evaluated in the frequency sub-band 112 (Band 2). In this case, if the first peak occurs at 2805 samples (after receiving the 17th symbol), then the unknown pattern corresponds to the pattern TFC 1, otherwise the unknown pattern corresponds to the pattern TFC 2. On the other hand, if the second group of patterns is selected in the first state 310, then the timing of the first peak of the output metric signal 215 ($m_{165}(l)$) is evaluated in the frequency sub-band 112 (Band 2). In this case, if the first peak occurs at 2640 samples (after receiving the 16th symbol), then the unknown pattern corresponds to the pattern TFC 3, otherwise the unknown pattern corresponds to the pattern TFC 4.

The first peak of the output metric signal can be detected with reference to a threshold crossing. This threshold can be implemented with the same threshold used for the first selected frequency sub-band, or can be adjusted to accommodate variations among channel conditions for the respective frequency sub-bands. For example, the threshold for the second selected frequency sub-band can be calculated based on a fraction of the peaks in the first frequency sub-band. Additionally, the threshold can be calculated based on a minimum of both the threshold used for the first frequency sub-band and the fraction of the peaks in the first frequency sub-band.

In the event that the first peak in the second frequency sub-band is not detected (i.e., the threshold is not crossed) before a counter expires, or if the first peak is detected at an unexpected time interval, then the system 300 is reset from the second state 320 to the first state 310. When the second state 320 is implemented in accordance with the WiMedia PHY specifications, the system 300 is reset if the first peak is not detected in the second frequency sub-band within 3135 samples (after receiving the 19th symbol). Note that the peak detection processes of states 210 and 220 can be executed several times, switching between numerous different frequency sub-bands.

In a third state 330, which corresponds to the time interval 130 shown in FIG. 1, the estimate of the unknown pattern is verified by selecting a third frequency sub-band, and evaluating the timing of the peaks of the metric $m_p(l)$ in the third selected frequency sub-band. In the example of FIG. 3, the frequency sub-band 113 (Band 3) is selected, and the timing of the peaks of the metric $m_p(l)$ is evaluated for either P=165 samples or P=495 samples, depending on which group of patterns is selected in the first state 310.

When the third state 330 is implemented in accordance with the WiMedia PHY specifications, and the estimated synchronization is accurate, the verification is performed after 3135 samples (after receiving the 19th symbol). For example, the pattern TFC 1 is verified as the unknown pattern when the peak is detected at 3960 samples (after receiving the 24th symbol), the pattern TFC 2 is verified as the unknown pattern when the peak is detected at 3795 samples (after receiving the 23rd symbol), the pattern TFC 3 is verified as the unknown pattern when the peak is detected at 3960 samples (after receiving the 24th symbol), and the pattern TFC 4 is verified as the unknown pattern when the peak is detected at 3630 samples (after receiving the 22nd symbol).

For a successful verification, the absolute value of the power level must exceed a predetermined threshold. The threshold for the third selected frequency sub-band can be implemented with the same threshold used for the first frequency sub-band. Alternatively, as described above, the threshold can be adjusted across the states 310-330 to accommodate variations among channel conditions for the respective frequency sub-bands and also to accommodate different system configurations. For example, the threshold for the third selected frequency sub-band can be calculated based on a ratio of the average of the peaks detected in the first and second frequency sub-bands. Additionally, the threshold can be calculated based on a minimum of both the threshold used for the first frequency sub-band and the ratio of the average of the peaks. If the threshold is not exceeded at the desired time, then the estimate of the unknown pattern is not verified and the system 300 is reset from the third state 330 to the first state 310.

Additionally, as described above, an initial synchronization estimate for the beginning of the packet is inherently determined with the selection of the frequency hopping pattern. Furthermore, because a noise level in the system can prevent sharp energy peaks, the estimated beginning of the packet can be evaluated as a weighted average of the timing of the peaks (appropriately centered) to minimize timing errors due to the noise and to provide a better timing estimation. Weights can be calculated based on the amplitudes of the peaks in the first and second frequency sub-bands, which are indicative of the SNR. The frequency sub-band with the better SNR will provide a better synchronization estimate.

In a fourth state 340, which corresponds to the time interval 140 shown in FIG. 1, a channel frequency response is estimated and reception and decoding of data is initiated. For example, the receiver can tune a local oscillator to the selected and verified pattern and evaluate further training and data transmission related samples (e.g., the samples FT 109 in FIG. 1). Additionally, for every metric peak found in one of the frequency sub-bands, the carrier frequency offset can be estimated as described in related U.S. patent application Ser. No. 11/369,867, entitled "Synchronizing to Symbols Received via Wireless Communications Channel," filed concurrently herewith. After the detection process, the carrier frequency offset estimates can be used for each of the frequency sub-bands separately, or an average of the carrier frequency offset estimates for all of the frequency sub-bands can be used depending on the implementation of the transmitter. As shown in FIG. 3, if the end of the packet or an error is detected, then the system 300 is reset from the fourth state 340 to the first state 310.

Although the foregoing description of techniques for detecting and synchronizing to frequency hopped packets is partially based on a signal transmitted according to the proposed WiMedia PHY specifications, these techniques can also be adapted to other packet-based transmission schemes that use frequency hopping.

Exemplary System for Detecting and Synchronizing to Frequency Hopped Packets

FIG. 4 illustrates a system 400 for detecting and synchronizing to frequency hopped packets in accordance with an exemplary embodiment of the present disclosure. The system 400 is implemented for a frequency hopping network and includes a transmitting device 405, which transmits interleaved blocks to a receiving device 410 via multiple frequency sub-bands 425 in a sequence that follows a frequency hopping pattern. The transmitting device 405 selects one of a finite set of predetermined frequency hopping patterns, and the selected pattern is used by all of the devices of the network. Although the system 400 is described below with reference to a WiMedia MBOA transceiver, persons of skill in the relevant art(s) will understand that the system can be adapted to other packet-based transmission schemes that use frequency hopping.

The receiving device 410, upon joining the network, detects packets without previous knowledge of the specific frequency hopping pattern selected by transmitting device 405, and identifies the selected frequency hopping pattern as described below. In one implementation, the receiving device 410 synchronizes to the detected packet and blocks according to the identified frequency hopping pattern. In another implementation, the receiving device 410 estimates the carrier frequency offset and channel state information.

The receiving device 410 includes a receiver unit 415 and a synchronization unit 420. The receiver unit 415 receives a packet of preamble symbols respectively transmitted over the frequency sub-bands 425 according to the selected frequency hopping pattern. In one implementation, the receiver unit 415 can distinguish between the beginning of the packet, the preamble of the packet, and noise, but can only receive on one of the frequency sub-bands at a time. The receiver unit 415 knows the duration of a single packet transmission, and the minimum time interval between successive packet transmissions. Furthermore, the receiver unit 415 can estimate the power level of the received signal, and, because the receiver unit 415 receives the packets from different transmitting devices, which are at different distances from the receiving device 410, the receiver unit 415 knows the expected power of the received signal within a specific range.

The synchronization unit 415 estimates the selected frequency hopping pattern being used by the network and synchronizes to the received packet according to an estimated pattern. First, the synchronization unit 420 selects a group of patterns from multiple disjoint groups of predetermined patterns, in accordance with the technique described above for implementing the first state 310, shown in FIG. 3. Briefly, the periodicity of the preamble symbol transmissions is unique for each group of patterns. Thus, the synchronization unit 420 selects the group of patterns by evaluating a correlation metric of the received preamble symbols in a first selected frequency sub-band for each of the associated periodicities. For example, when the synchronization unit 420 evaluates the correlation metric in the first selected frequency sub-band for a first associated periodicity, consecutive signal peaks that exceed a predetermined threshold are detected, while for a second associated periodicity, consecutive signal peaks that exceed a predetermined threshold are not detected. In this case, the synchronization unit 420 selects the group of patterns for the first associated periodicity for which the correlation metric output signal has consecutive signal peaks that exceed the threshold.

The synchronization unit 420 then selects the estimated pattern from the selected group of patterns in accordance with the technique described in detail above for implementing the second state 320, shown in FIG. 3. Briefly, the timing of the first peak of the correlation metric is unique for each one of the patterns in the selected group of patterns. Thus, the synchronization unit 420 evaluates the timing of the first peak of the correlation metric at a particular interval in a second selected frequency sub-band, and selects the pattern from the group of patterns that corresponds to the evaluated timing as the estimated pattern.

Optionally, the synchronization unit 420 verifies that the estimated pattern corresponds to the transmitter frequency pattern by comparing the correlation metric t a particular time interval to a threshold value in a third selected frequency sub-band in accordance with the technique described in detail above for implementing the third state 330, shown in FIG. 3.

It should be noted that in accordance with an aspect of the present disclosure, the system 400 illustrated in FIG. 4 can be employed in conjunction with a computer-based system, where the elements can be implemented in hardware, software, firmware, or combinations thereof.

Exemplary Method for Detecting and Synchronizing to Frequency Hopped Packets

FIG. 5 is a flowchart providing steps for a method 500 for detecting and synchronizing to frequency hopped packets in accordance with an exemplary embodiment of the present disclosure. Not all of the steps of FIG. 5 have to occur in the order shown, as will be apparent to persons skilled in the relevant art(s) based on the teachings herein. Other operational and structural embodiments will be apparent to persons skilled in the relevant art(s) based on the following discussion. These steps are described in detail below.

It should be noted that in accordance with an aspect of the present disclosure, the method illustrated in FIG. 5 can be employed in conjunction with a computer-based system, where the method can be implemented in hardware, software, firmware, or combinations thereof. For example, the receiver unit 415, shown in FIG. 4, can be used to implement step 505, and the synchronization unit 420 can be used to implement steps 510, 515, and 520.

As shown in FIG. 5, in step 505, a packet of preamble symbols, respectively transmitted over multiple frequency sub-bands according to a transmitter frequency hopping pattern, is received.

In step 510, predetermined frequency hopping patterns are partitioned into disjoint groups of patterns, each group having an associated periodicty of the received preamble symbols. For example, as described in detail above, the patterns TFC 1 and TFC 2 can be partitioned into a first group of patterns corresponding to a period of P=495 samples, while the patterns TFC 3 and TFC 4 can be partitioned into a second group of patterns corresponding to a period of P=165 samples.

Next, in step 515, a group of patterns is selected from the disjoint groups of patterns by comparing a correlation metric of two received preamble symbols for each of the associated periods in a first selected frequency sub-band. As described in detail above for the first state 310, shown in FIG. 3, the correlation metric for each of the associated periods is compared in the first selected frequency sub-band. The group of patterns having the associated periodicity for which peaks of the correlation metric exceed a predetermined threshold is selected.

Finally, in step 520, a particular pattern is selected from the selected group of patterns based on a timing of the first peak of the correlation metric in a second selected frequency sub-band. As described in detail above for the second state 320, shown in FIG. 3, each of the patterns in the selected group of patterns is associated with a unique timing of the first peak. Thus, the pattern that corresponds to the evaluated timing in the second selected frequency sub-band is selected as the estimate of the transmitter frequency hopping pattern.

Optionally, the method 500 further includes step 525. In step 525, the selected pattern is verified as the transmitter frequency hopping pattern by comparing the correlation metric at a particular time interval to a threshold value in a third selected frequency sub-band in accordance with the technique described in detail above for implementing the third state 330, shown in FIG. 3.

CONCLUSION

The present invention has been described with reference to a number of exemplary embodiments. However, it will be apparent to those skilled in the art that it is possible to embody the invention in specific forms other than those described above without departing from the spirit of the invention.

Although the embodiments of the present invention for detecting and synchronizing to frequency hopped packets described herein are partially based on the proposed WiMedia PHY specifications, it should be noted that these techniques can also be adapted to other packet-based transmission schemes that use frequency hopping. Note that depending on the scheme, the number of frequency sub-bands employed by the frequency hopping pattern can be greater than three, and the number of groups of frequency hopping patterns can be greater than two.

Accordingly, the various embodiments described herein are illustrative, and they should not be considered restrictive in any way. The scope of the invention is given by the appended claims, rather than the preceding description, and all variations and equivalents thereof that fall within the range of the claims are intended to be embraced therein.

What is claimed is:

1. A method for synchronizing a receiver to a frequency hopping pattern, comprising the following steps:

partitioning a plurality of predetermined frequency hopping patterns into a plurality of disjoint groups each having a different associated periodicity;

analyzing a correlation metric relating to a signal received by a receiving device in one selected frequency sub-band relative to the periodicities associated with the plurality of groups to determine periodicity of the signal;

selecting one of the groups of frequency hopping patterns based on the analysis;

detecting peaks at least in the correlation metric of the received signal in the selected frequency sub-band and in the correlation metric of the received signal in one other frequency sub-band;

identifying one frequency hopping pattern within the selected group on the basis of the detected peaks; and synchronizing the receiving device to the signal received by the receiving device according to the identified frequency hopping pattern.

2. A method for synchronizing a receiver to a transmitter frequency hopping pattern, comprising the following steps:
receiving by a receiving device a signal including a packet comprising a plurality of preamble symbols respectively transmitted over a plurality of frequency sub-bands according to the transmitter frequency hopping pattern;
partitioning a plurality of predetermined frequency hopping patterns into a plurality of disjoint groups of patterns, wherein each group has an associated periodicity of the received preamble symbols;
selecting a group of patterns from the plurality of groups by comparing a correlation metric of two received preamble symbols for each of the associated periodicities in a first selected frequency sub-band and determining periodicity of the received signal;
selecting a pattern from the selected group of patterns based on a timing of a detected first peak of the correlation metric in a second selected frequency sub-band; and
synchronizing the receiving device to the packet according to the selected pattern.

3. The method of claim 2, further comprising the step of verifying that the selected pattern corresponds to the transmitter frequency hopping pattern by comparing the correlation metric at a particular time interval to a threshold value in a third selected frequency sub-band.

4. The method of claim 3, wherein the threshold value is based on observations of the metric in at least one of the selected frequency sub-bands.

5. The method of claim 3, wherein the threshold value is selected to according to variations in channel conditions for the third selected frequency sub-band.

6. The method of claim 3, wherein the step of verifying comprises determining that the selected pattern corresponds to the transmitter frequency hopping pattern when the power level of the correlation metric in the third selected frequency sub-band at the particular time interval exceeds the threshold value.

7. The method of claim 2, wherein the step of selecting a group of patterns comprises selecting a group of patterns having an associated periodicity for which the correlation metric exceeds a threshold value.

8. The method of claim 7, wherein the threshold value is based on at least one optimal signal-to-noise ratio in at least one of the selected frequency sub-bands.

9. The method of claim 7, wherein the step of selecting a group of patterns comprises detecting an energy peak when the correlation metric exceeds the threshold value.

10. The method of claim 9, wherein the step of selecting a group of patterns comprises selecting a group of patterns having an associated periodicity for which at least one energy peak is detected.

11. The method of claim 2, wherein the step of selecting a pattern comprises detecting the first peak of the correlation metric by comparing the correlation metric to a threshold value.

12. The method of claim 11, wherein the threshold value is based on observations of the metric in at least one of the selected frequency sub-bands.

13. The method of claim 11, wherein the threshold value is selected according to variations in channel conditions for the second selected frequency sub-band.

14. The method of claim 2, wherein the step of selecting a pattern comprises returning to the step of selecting a group of patterns when the first peak is not detected in the second selected frequency sub-band within a particular time interval.

15. The method of claim 2, further comprising the step of estimating a beginning of the received packet for the selected frequency sub-bands.

16. The method of claim 2, further comprising the step of tuning a local oscillator to the selected pattern.

17. The method of claim 2, wherein the step of receiving a packet comprises synchronizing to the received preamble symbols.

18. A computer readable medium having stored therein a program, which when executed causes a processor to perform the following functions for detecting a transmitter frequency hopping pattern:
comparing a correlation metric of preamble symbols respectively transmitted over a plurality of frequency sub-bands according to the transmitter frequency hopping pattern in one selected frequency sub-band to determine periodicity of the preamble symbols;
selecting a group of patterns from a plurality of disjoint groups of predetermined frequency hopping patterns based on the determined periodicity of the preamble symbols, each group having an associated periodicity, based on the comparison of the correlation metric for each of the associated periodicities in a first selected frequency sub-band; and
selecting a pattern from the selected group of patterns based on a timing of a detected first peak of the correlation metric in a second selected frequency sub-band.

19. A system for detecting a transmitter frequency hopping pattern, comprising:
a receiver which receives a signal including a packet comprising a plurality of preamble symbols respectively transmitted over a plurality of frequency sub-bands according to the transmitter frequency hopping pattern; and
a synchronization unit coupled to the receiver configured to synchronize to the received packet according to a selected pattern,
wherein the synchronization unit selects a group of patterns from a plurality of disjoint groups of predetermined patterns based on analyzing a correlation metric of the signal in a first selected frequency sub-band to determine an associated periodicity of the received preamble symbols,
wherein the synchronization unit selects the pattern from the selected group of patterns based on a timing of a first peak of the correlation metric in a second selected frequency sub-band, and
wherein the receiver synchronizes to the received signal on the basis of the selected pattern.

20. The system of claim 19, wherein the synchronization unit verifies the selected pattern corresponds to the transmitter frequency pattern by comparing the correlation metric at a particular time interval to a threshold value in a third selected frequency sub-band.

21. The system of claim 19, wherein the system implements a WiMedia MultiBand OFDM Alliance (MBOA) frequency transmission scheme.

22. The system of claim 19, wherein the plurality of groups of patterns exceeds two in number, and wherein the associated periodicity for each of the groups of patterns is different.

* * * * *